Figure 1:
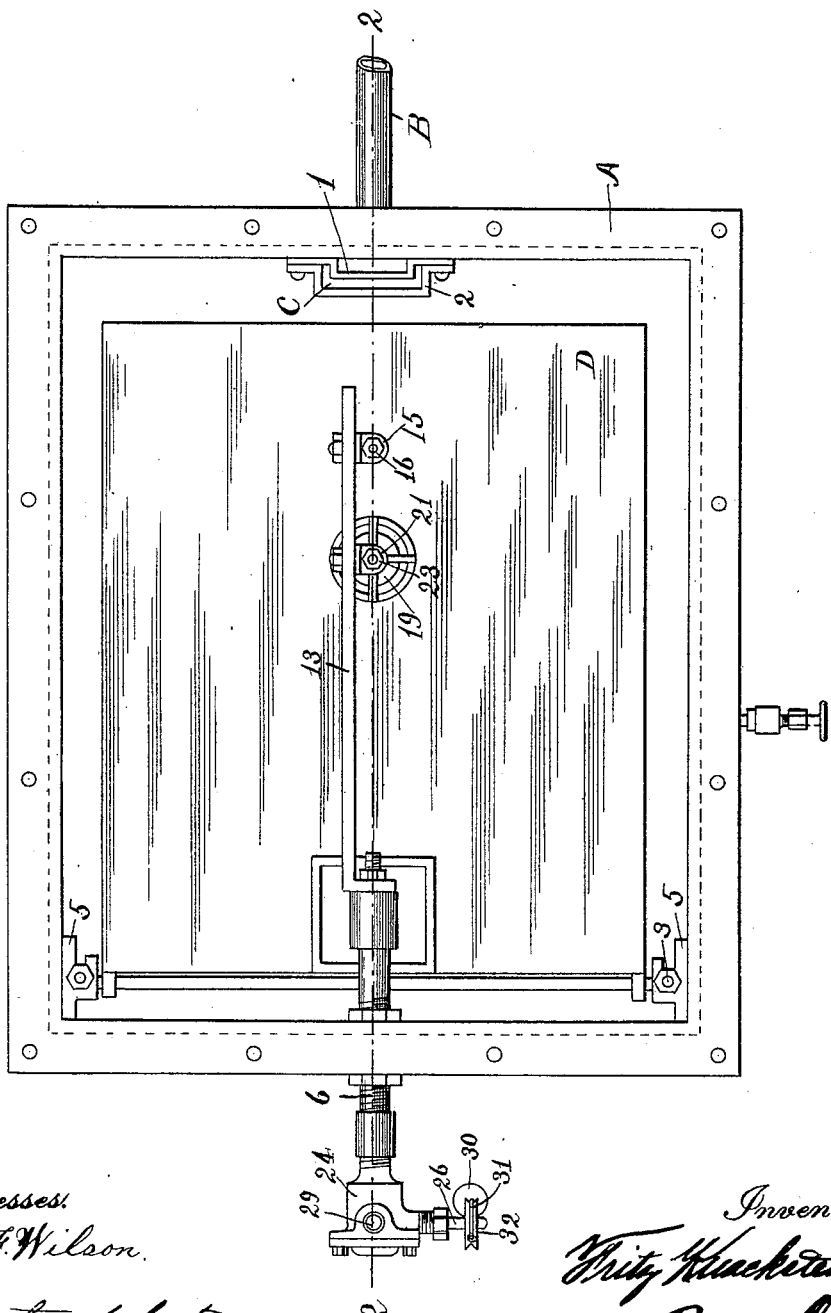

No. 643,415. Patented Feb. 13, 1900.
F. KNACKSTEDT.
STEAM TRAP.
(Application filed May 15, 1899.)
(No Model.) 2 Sheets—Sheet 1.

Witnesses:
E. F. Wilson.
Arthur L. Lotz

Inventor:
Fritz Knackstedt
By Rudolph L. Lotz
Atty.

No. 643,415. Patented Feb. 13, 1900.
F. KNACKSTEDT.
STEAM TRAP.
(Application filed May 15, 1899.)
(No Model.) 2 Sheets—Sheet 2.
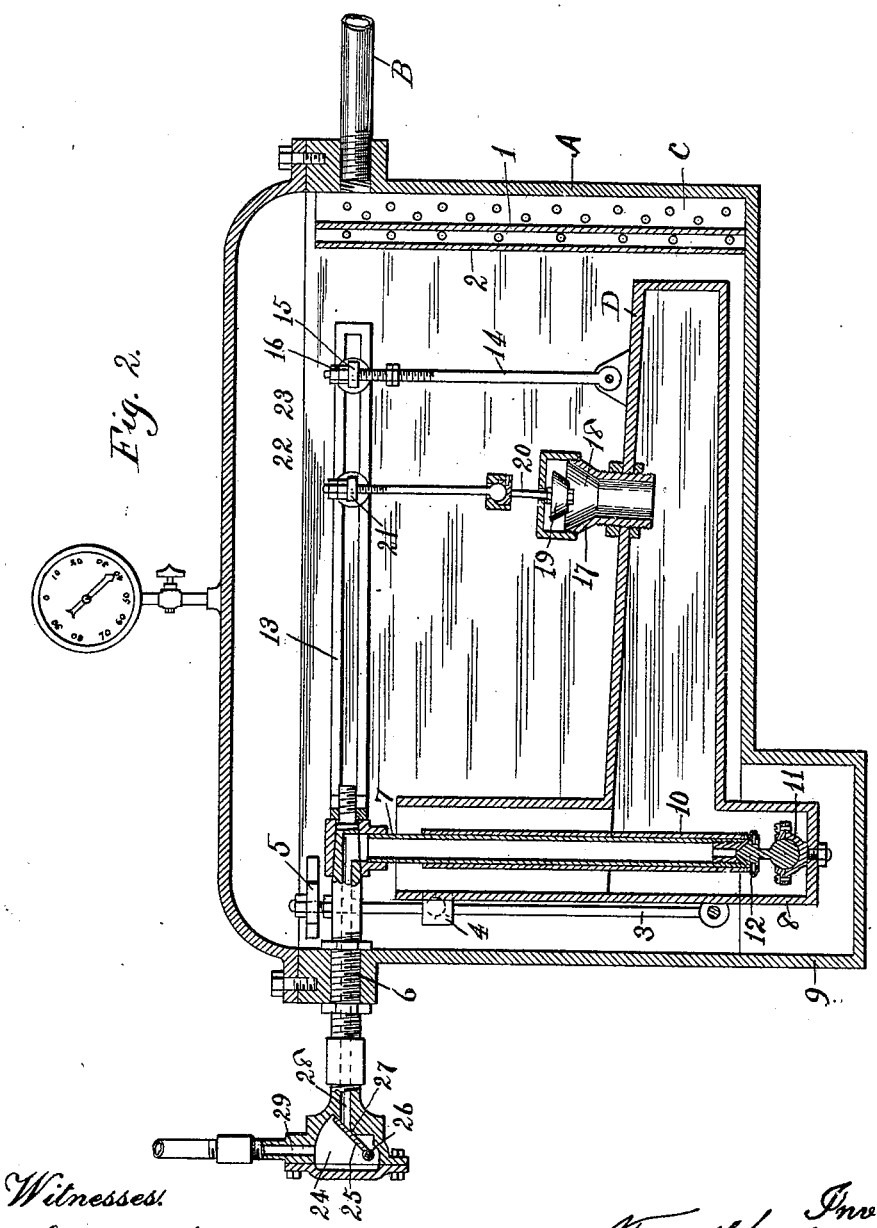

UNITED STATES PATENT OFFICE.

FRITZ KNACKSTEDT, OF CHICAGO, ILLINOIS.

STEAM-TRAP.

SPECIFICATION forming part of Letters Patent No. 643,415, dated February 13, 1900.

Application filed May 15, 1899. Serial No. 716,787. (No model.)

*To all whom it may concern:*

Be it known that I, FRITZ KNACKSTEDT, a citizen of the United States, residing at Chicago, in the county of Cook and State of Illinois, have invented certain new and useful Improvements in Steam-Traps; and I do hereby declare the following to be a full, clear, and exact description of the invention, such as will enable others skilled in the art to which it appertains to make and use the same.

My invention relates to a novel construction in a steam-trap, the object being to provide a device of this description which will automatically drain itself of water, but will not permit the escape of any steam; and it consists in the features of construction and combinations of parts hereinafter fully described and claimed.

In the accompanying drawings, illustrating my invention, Figure 1 is a top plan view of a steam-trap constructed in accordance with my invention, the cover being removed. Fig. 2 is a vertical longitudinal section of same on the line 2 2 of Fig. 1.

My present invention is designed as an improvement upon the device for which Letters Patent No. 622,925 were granted to me on April 11, 1899. The alterations shown and described herein, though seemingly slight, have been found by me to be essential to the practicability of the device in that they render it more simple and allow of greater variations in the adjustments of the parts.

Referring now to said drawings, A indicates a casing or trap having an inlet B and a perforated chamber C, adapted to receive and break the force of the influx of water. The said chamber C has an inner partition 1, perforated on all sides, and an outer partition or wall 2, perforated on two sides, but having an unbroken wall opposite the inlet. A float D is pivotally mounted within said casing A at the lower ends of two rods 3, provided with universal joints 4 between their ends and which are screw-threaded at their upper ends to receive nuts which engage bifurcated lugs 5 on a wall of said casing A to permit said rods limited pivotal motion. In this manner said float D is permitted a compound pivotal movement. Said float D consists of a flat box-like receptacle, tapered toward its free end and provided adjacent its other end with an upward extension D', open at its upper end. A drain-pipe 6 enters said casing A adjacent its upper end and is provided with a downwardly-extending branch 7, projecting into said casing and terminating in a small downward extension 8 of said float D and below the bottom thereof. Said casing A is provided with an extension 9 to receive said extension 8 of said float. The said branch 7 carries a T-coupling at its upper end, the horizontal opening of which is ground to a taper which receives the tapered end of the pipe 6, thus providing a tight joint between said pipe 6 and said T-coupling. Said branch 7 of said drain-pipe 6 fits telescopically into a tube or cylinder 10, pivoted universally in said extension 8 of said float, as indicated at 11. Said cylinder 10 is perforated adjacent its lower end and is provided interiorly with a conical nipple 12, adapted to form a valve fitting within a conical valve-seat in the lower end of said branch 7. Said pipe 6 carries a reduced screw-threaded projection at its inner end, adapted to pass through an opening in the end of a slotted arm 13, which extends over said float, said arm being firmly held by means of a nut in said screw-threaded projection, which likewise serves to draw said tapered end of said pipe 6 tightly into said tapered opening in said T-coupling. Said arm 13 is connected with said float by means of a rod 14, passing through a collar 15 on said arm 13 and pivoted at its lower end to a lug on the top of said float. Said rod 14 carries a lock-nut 16 at its upper end, which is adapted to engage said collar 15 to limit the downward movement of said float. A valve-casing 17 is mounted upon said float, passing through the top thereof, and is secured thereto in any suitable manner. A valve-seat 18 is formed in said valve-casing 17 above the bottom of said float, and above said valve-seat said casing 17 is provided with a cover. A valve 19, adapted to fit said valve-seat 18, is mounted upon the lower end of a rod 20, passing through a collar 21 on said arm 13, and which is adjusted so as to cause said valve 19 to fit said valve-seat 18 to close said valve at the same time that said branch 7 of said drain-pipe 6 is closed by means of the nuts 22 and 23, which are so placed as to allow said rod 20 slight play. Said rod is also provided with a universal joint between its ends to allow sufficient play to enable said valve 19 to properly seat itself. The said valve 19 and rod 20 limit the upward movement of said float D. At the outlet end of said drain-pipe 6 a valve 24 is mounted, which is provided with a leaf or plate 25, mounted upon a shaft 26 and closely fitting an inclined seat 27, surrounding the opening 28, leading to said pipe 6. The outlet-opening 29 of said valve is located adjacent its rear end, so that before any water can pass through said valve said leaf or plate 25 uncovers said opening 28. Thus said leaf or plate 25 is caused to move through an arc of about forty-five degrees every time the trap is drained. Said leaf or plate is normally held in position to close said opening 28 by means of a weight 30 at the end of a cord 31, 31, trained over a pulley 32 on said shaft 26.

The operation of my device is as follows: As said casing A gradually fills with water the float D rises before the water reaches the level of the perforations in the valve-casing 17 until the valve seat 18 is closed by means of the valve 19 and the branch 7 is closed by the nipple 12. The float then stops and the water continues to rise around same until it overflows into said float, which when sufficiently filled drops, thus permitting water to enter through said valve-casing 17 and also uncovering the branch 7. The water is then forced by the steam-pressure through the perforations in the cylinder 10 and into said drain-pipe to the valve 24, which it opens, and thence passes out to any desired vessel. The casing is thus drained until the water therein is reduced to the level of the perforations in the valve-casing 17; but the float continues to drain and gradually rises as it is drained until the valve-seat 18 again comes into contact with and is closed by the valve 19, and the nipple 12 simultaneously closes the branch 7. Drainage then ceases until the water in casing A again overflows into said float D. A practically given quantity of water is thus drained from said trap at intervals, and each such quantity may obviously be registered by connecting a register with said shaft 26.

By means of the triple pivotal connection between the float and the supporting-lugs said float can obviously move vertically until the nipple is firmly seated, thus compensating for any slight discrepancies in the adjustment.

I claim as my invention—

1. In a steam-trap, the combination with a casing, of a float mounted therein, rods pivotally connected with said float at their lower ends and with lugs on said casing at their upper ends and provided with movable joints between their ends, devices for limiting the movements of said float, an overflow-valve and an outlet-valve on said float adapted to be controlled by the movements thereof, said float being open at its upper end to admit water.

2. In a steam-trap, a casing, a float pivotally mounted within said casing and consisting of a flat box-like receptacle tapered toward its free end and provided at its other end with a downward extension and with an upward extension open at its upper end, a water-outlet pipe extending into said casing and carrying a downward extension extending into said extensions of said float, a tube pivotally mounted in said downward extension of said float and adapted to fit telescopically over said downward extension of said outlet-pipe, perforations in the lower end of said tube, a nipple adapted to close said downward extension of said outlet-pipe when said float is raised, an overflow-valve mounted upon the free end of said float, connection between the valve of said steam-trap and a slotted arm for supporting said valve to admit water when said float is at the lower limit of its movement, and connection between said float and said slotted arm for limiting the upward movement of said float, substantially as described.

3. In a steam-trap, a casing having an inlet, an outlet-pipe projecting into said casing and provided with a ground tapered end, a screw-threaded projection at the end of said pipe, a T-coupling having a tapered opening adapted to receive said tapered end of said outlet-pipe, a downwardly-extending pipe carried by said coupling, a slotted arm having a perforated projection adapted to receive said screw-threaded projection, a nut on said projection adapted to secure said arm and simultaneously force said T-coupling tight upon said tapered end of said outlet-pipe, a float pivotally mounted in said casing valve-controlled connection between said downward extension of said outlet-pipe and said float to drain the latter, connection between said float and said slotted arm to limit the movement of said float, a valve-casing on said float, and a valve to control the same mounted upon the lower end of a rod hung from said slotted end, substantially as described.

In testimony whereof I affix my signature in presence of two witnesses.

FRITZ KNACKSTEDT.

Witnesses:
  RUDOLPH WM. LOTZ,
  E. F. WILSON.